United States Patent [19]

Dijkstra et al.

[11] Patent Number: 5,214,171
[45] Date of Patent: May 25, 1993

[54] PROCESS FOR FRACTIONATING PHOSPHATIDE MIXTURES

[75] Inventors: Albert J. Dijkstra, Kortrijk; Jan De Kock, Denderleeuw, both of Belgium

[73] Assignee: N.V. Vandemoortele International, Kortrijk, Belgium

[21] Appl. No.: 795,264

[22] Filed: Nov. 19, 1991

Related U.S. Application Data

[63] Continuation of Ser. No. 447,138, Dec. 8, 1989, abandoned.

[30] Foreign Application Priority Data

Dec. 8, 1988 [EP] European Pat. Off. ........ 88120502.5

[51] Int. Cl.$^5$ ................................. C07F 9/10
[52] U.S. Cl. .............................. 554/83; 558/146; 558/150
[58] Field of Search ............. 558/146, 150; 554/83; 436/104

[56] References Cited

U.S. PATENT DOCUMENTS

| | | | |
|---|---|---|---|
| 2,724,649 | 11/1955 | Julian et al. ........................ | 554/83 |
| 3,739,047 | 6/1973 | Stanford et al. .................... | 558/146 |
| 4,235,793 | 11/1980 | Betzing ............................... | 260/403 |
| 4,425,276 | 1/1984 | Gunther .............................. | 260/403 |
| 4,698,185 | 10/1987 | Dijkstra et al. ..................... | 260/403 |

FOREIGN PATENT DOCUMENTS

| | | |
|---|---|---|
| 1692568 | 8/1971 | Fed. Rep. of Germany . |
| 412224 | 6/1934 | United Kingdom . |
| 877031 | 9/1961 | United Kingdom . |
| 1217846 | 12/1970 | United Kingdom . |
| 1350390 | 4/1974 | United Kingdom . |

OTHER PUBLICATIONS

Shchipunov et al., Chemical Abstracts, vol. 100, 1984, Abstract 1454512.

*Primary Examiner*—Robert T. Bond
*Assistant Examiner*—E. C. Ward
*Attorney, Agent, or Firm*—Cushman, Darby & Cushman

[57] ABSTRACT

Process for fractionating phosphatide mixtures into two or more fractions which are enriched in one or more of phosphatidyl choline (PC), phosphatidyl ethanolamine (PE), phosphatidyl inositol (PI) and phosphatidic acid (PA) by carrying out extraction steps using alcoholic solvent in which the solubilities of PC, PE and PA are controlled by suitably adjusting the acidity of the solvent, the pH being adjusted to above 8 for solubilizing PC and PE and to below 5 for solubilizing PA. PI is substantially insoluble in the solvent used in the process and thus is mainly recovered in the extraction residue. Further parameters influencing the solubility of the components of the phosphatide mixtures to be fractionated are water content of the alcoholic solvent, temperature and choice of bases and acids for adjusting the pH. For further separating fractions rich in PC and PE di- or trivalent metal salt solutions are used.

21 Claims, No Drawings

PROCESS FOR FRACTIONATING PHOSPHATIDE MIXTURES

This is a continuation of application No. 07/447,138, filed on Dec. 8, 1989, which was abandoned upon the filing hereof Nov. 19, 1991.

BACKGROUND OF THE INVENTION

The invention relates to a process for fractionating phosphatide mixtures into two two or more fractions which are enriched in one or more of phosphatidyl choline (PC), phosphatidyl ethanolamine (PE), phosphatidyl inositol (PI) and phosphatidic acid (PA).

Phosphatides are commonly produced by water-degumming crude vegetable oils, particularly crude soy bean oil. In this process, water is finely dispersed in hot crude oil as a result of which most phosphatides present in the oil are hydrated and form a separate phase which is removed from the oil by centrifuge. The gums thus obtained are generally dried to yield lecithin, a product of commerce.

This lecithin is a complex mixture containing approximately 30% triglycerides and about 55% phosphatides, the remainder comprising sugars, glycolipids, partial glycerides, free fatty acids, residual meal particles and other compounds of an as yet unknown nature. The phosphatide composition of commercial soy lecithin can vary considerably but some of the variations reported in the literature (AOCS Monograph 12, Lecithins. Ed. B. V. Szuhaj and G. R. List, 1985, page 13) certainly stem from differences in analytical methods used. As an average composition, the following data can be quoted:

| | |
|---|---|
| phosphatidyl choline (PC) | 33% |
| phosphatidyl ethanolamine (PE) | 26% |
| phosphatidyl inositol (PI) | 23% |
| phosphatidic acid (PA) | 10% |
| others, unknowns | 8% | wherein the "others" also comprise lysocompounds such as lysophosphatidyl choline (LPC), etc.

Water-degummed oil still contains some residual phosphatides and according to U.S. Pat. No. 4,698,185 these can be removed from this oil by finely dispersing a non-toxic acid in the oil. After a contact time that is sufficiently long to ensure the decomposition of the alkaline earth salts of phosphatidic acid, a base is added to raise the pH above 2.5 without substantial formation of soaps whereupon the gums are removed and may be dried. Gums thus obtained contain both salts stemming from the acid and base used in the process and organic components which are predominantly triglycerides and phosphatides with a high PA-content.

Since lecithin has become commercially available, a number of processes have been developed to purify, modify, de-oil and fractionate this product, whereby the fractionation processes specifically aim at producing PC-enriched fractions. Such processes generally lead to products of enhanced functionality in the applications for which they have been developed.

One such de-oiling process has been described in British patent 412,224. It involves treating commercial lecithin with acetone or a mixture of acetone and alkanes. Since phosphatides are insoluble in acetone and triglycerides dissolve in this solvent, an oil-free lecithin with increased phosphatide content results.

A process aiming at PC-enrichment employing solvent fractionation of de-oiled lecithin is described in British patent 877,031. Alcohol is used as a solvent because this solvent exhibits a better solubility for PC than for PI, the solubility for PE being intermediate. According to German patent 14 94 952 the PC-selectivity of this process is improved by using aqueous alcohol and according to German Patent 16 92 568 further improvement is possible by adding monoglycerides. According to H. Pardun (Fette, Seifen, Anstrichmittel, 84, 1–11, 1982) it is possible to produce alcohol-soluble lecithin fractions with a PC/PE-ratio of more than 4 by first of all desugaring the gums, drying the desugared gums, de-oiling the dried gums and then fractionating the de-oiled lecithin. For the fractionating step the use of alcohol/hexane-mixtures is proposed. In a later article H. Pardun (Fette, Seifen, Anstrichmittel, 86, 55–62, 1984) provides a pretty comprehensive summary of the prior art including the fractionation techniques known from the afore-mentioned references.

In order to further enrich the PC-content of the PC-enriched fractions obtained by the alcoholic extraction of desugared, de-oiled lecithin, three types of process have been reported. The first type of process employs a chromatographic method (British patent 877,031) in that the PC-enriched alcoholic solution is treated with an adsorbent e.g. aluminum oxide which selectively adsorbs the PE present in the alcoholic solution. The second type of process (British patents 1 217 846 and 1 350 390) is based upon the conversion of the PE present in lecithin or its alcohol soluble fraction to acetylphosphatidylamine (APE) by treatment with e.g. acetic acid anhydride which APE is soluble in acetone at pH values above 8.5 or below 3.5 whereas PC is acetone insoluble. The third type of process (European patent 0 090 454) achieves a separation between PC and PE by treating a solution containing these two compounds with an alcoholic solution of e.g. magnesium sulphate as a result of which the PE preferentially precipitates.

The above processes have the disadvantage that they require a multitude of steps to arrive at just more or less pure PC and a PC-depleted residue and do not provide a route to fractions in which PA, PE or PI are the main constituent. Besides, the PC-yield attainable with the above processes is reputed to be unsatisfactory and to be 60% of theory at the most under favourable conditions.

OBJECTS OF THE INVENTION

Therefore it is an object of the invention to provide a process for the fractionation of mixtures of phosphatides that yields fractions having the individual constituent phosphatides present in the mixture as main constituents.

It is a further object of the invention to provide a fractionation process capable of handling mixtures of phosphatides which mixtures may also contain triglycerides, partial glycerides, free fatty acids and other compounds that are commonly present in gums resulting from various degumming processes of vegetable oils and which mixtures may even contain some water.

It is also an object of the invention to fractionate mixtures of phosphatides in a minimum number of separation stages and to use minimal amounts of solvent.

It is a further object of the invention to provide a route to various salts of phosphatidic acid which salts may be oil-free or admixed with triglyceride oils.

It is an additional object of the invention to provide a process for the fractionation of phosphatide mixtures of various phosphatide compositions and/or stemming from different agricultural origins.

It is also an object of the invention to minimize solvent recovery problems by using a single solvent or single solvent mixture.

DETAILED DESCRIPTION OF THE INVENTION

The invention is directed to the solvent fractionation of mixtures of phosphatides, which mixtures may also contain non-phosphatidic components, as described herein and in the dependent claims, whereby use is made of the observation that the solubilities of individual phosphatides in $C_1$ to $C_3$ alcohols or mixtures thereof are affected differently by changes in the acidity of the solvent or solvent mixtures.

The process according to the invention is a process for fractionating phosphatide mixtures into two or more fractions which are enriched in one or more of phosphatidyl choline (PC), phosphatidyl ethanolamine (PE), phosphatidyl inositol (PI) and phosphatidic acid (PA) by carrying out the following process steps:

a) extracting the phosphatide mixture one or more times with a solvent selected from $C_1$ to $C_3$ alcohols or mixtures thereof having a water content in the range of 0 to 20% by weight, b) separating the solvent phase from the extraction residue and recovering the residue, c) recovering the extracted phosphatide(s) from the solvent phase by precipitating the phosphatide(s) and/or removing the solvent, and optionally d) subjecting one or more of the fractions obtained in steps b) and c) to a further treatment in accordance with steps a) to c) at a different solvent acidity, and by controlling the solubilities of PC, PE and PA by suitably adjusting the acidity of the solvent, the pH being adjusted to above 8 and preferably above 9 for solubilizing PC and PE, the pH being adjusted to below 5, preferably below 3 and more preferably below 2 for solubilizing PA, PI being substantially insoluble and thus mainly recovered in the extraction residue.

In the present context, the acidity of the solvent or solvent mixture is defined as the reading of a pH-electrode immersed in the alcoholic solution. This reading turns out to be quite reproducible and is therefore suitable for process control. pH-values below 0 and above 11 should be avoided. Thus statements like adjusting the pH to below 5 means adjusting the pH to 0 to 5 while similarly adjusting the pH to above 8 shall mean adjusting the pH to 8 to 11.

If lecithin or any phosphatide mixture that may contain triglycerides and other components normally associated with its isolation, is mixed with alcohol, a two-phase system results that on settling yields an alcoholic upper layer containing some phosphatides and possibly triglycerides etc. and a phosphatidic lower layer containing the remainder of the triglycerides etc. and some alcohol, the distribution of the various components over both phases being governed by the lecithin/solvent-ratio, the lecithin composition, the temperature and the solvent composition, especially its water content. In general, the solvent layer contains more phosphatides at elevated temperatures, at reduced water content and increased chain length of the alcohol.

It has now surprisingly been found that this distribution also depends quite strongly upon the acidity of the solvent and that different phosphatides are affected differently by changes in acidity. It has, for instance, been observed that phosphatidic acid (PA), which is only sparingly soluble at non-adjusted pH becomes much more soluble in the alcoholic solvent when its pH is reduced to below 5 and even more when reduced below 3 or 2 by the addition of an acid. On the other hand, raising the pH from its non-adjusted level hardly affects the PA-solubility.

Phosphatidyl inositol (PI) demonstrates a quite different behaviour in function of acidity in that its solubility is low and remains low whatever the acidity. Phosphatidyl choline (PC) behaves quite differently again. At non-adjusted pH, PC is reasonably soluble as reported already in the literature and this solubility can be somewhat but only slightly increased by the addition of an acid but increases quite considerably when the pH is raised to for instance 10 or above 10.

Phosphatidyl ethanolamine (PE) exhibits at non-adjusted pH a considerably lower solubility than PC which decreases slightly on lowering the pH but increases considerably when the pH of the alcoholic solvent is raised to above 8 and increases about four fold when the pH is raised to above 10, e.g. to 10 to 11.

As a result, the total phosphatide content of the alcoholic phase is also strongly affected by its acidity, being lowest at non-adjusted pH, about twice as high at pH of approximately 2 and about twice as high again at a pH of approximately 10.

No explanation for these surprising phenomena presents itself. The behaviour of PA could, perhaps, be tentatively explained by assuming that this compound occurs in its non-dissociated form at pH-values well below its lowest pK and making a further assumption that non-charged phosphatides exhibit a higher solubility than charged ones, but these assumptions are contradicted by the behaviour of PE. At high pH-values this molecule should have a negatively charged phosphate group and its amino group should be deprotonated and thus carry no charge, so that the molecule as a whole should be charged and exhibit decreased solubility according to the above assumption, whereas in actual fact its solubility is greatly increased at increased pH.

The above observations form the basis of the many fractionation steps that form part of the present invention. Isolating PA from gums as obtained by the process as described in U.S. Pat. No. 4,698,185 can be achieved by washing these gums which need not necessarily be dried with an acidified alcohol, separating the alcoholic extract from the extraction residue and by precipitating the PA by raising the pH. It is immaterial which acid and which base are used for controlling the acidity of the alcoholic solution. Hydrochloric acid and ammonia lead to isolation of the PA as its mono-ammonium salt but if another salt as for example the mono-sodium salt is desired this can be obtained by using for instance caustic soda for raising the pH.

A PC-enriched fraction can be isolated in high yield and with minimum use of solvent by extracting lecithin with an alkaline alcohol, separating the extract from the extraction residue, precipitating the PE present in the extract by the addition of a sufficient amount of a di- or trivalent metal salt (preferably in form of a solution, most preferably an alcoholic solution, the alcohol preferably being the same alcohol or alcohol mixture used for the treatment of the phosphatide mixture), for instance calcium chloride, to leave most of the PC in solution and to precipitate most of the PE, separating the precipitate and recovering the PC from the solution. This recovery can be by evaporation to dryness or by addition of a precipitating agent for PC and separating the formed precipitate. Useful precipitating agents are acids, preferably in an amount that is sufficient to lower the pH to near neutral. Also water is a very useful precipitating agent for PC. The method of evaporation to dryness gives the highest yield of PC but then the PC thus obtained also contains most impurities that have been extracted from the lecithin. The method of lowering the pH by the addition of an acid and the method of adding water lead to a somewhat lower yield but the PC-fraction thus obtained is only slightly coloured and has a bland taste.

The PE-precipitate obtained above constitutes a highly enriched PE-fraction and the extraction residue contains both PI and PA. This residue can again be fractionated by extracting it with acidified alcohol as a result of which the PA present is dissolved. After separation of the extract and its residue, the latter constitutes the PI-fraction whereas a PA-enriched fraction can be isolated from the former by raising the pH by the addition of a base and recovering the formed precipitate.

The extraction residues and precipitates obtained in the process according to the present invention usually contain more or less solvent and accordingly are sometimes more precisely referred to as "heavy phase" in comparison to the light solvent phase.

The process according to the invention can be applied to commercial lecithin, de-oiled lecithin, gums or dried gums as obtained according to the process described in U.S. Pat. No. 4,698,185 and their agricultural origin is in fact immaterial. Soy bean lecithin can be used as well as sunflower lecithin, rape seed lecithin or corn germ oil lecithin.

The process according to the invention can be carried out as a batch process but a continuous way of operation is also possible and even has advantages of higher yields, purities or reduced solvent usage. In a continuous operation counter-current liquid/liquid-extraction systems and mixer/settler systems or centrifuges can advantageously be used.

The phosphatide mixture to solvent ratio usually is in the range of 1:1 to 1:10, preferably 1:2 to 1:6 and more preferably about 1:3 (wt/vol; g/ml). The optimum ratio of phosphatide mixture to solvent depends on the nature of the phosphatides and the extraction technique used (see above). However, ascertaining the best ratio for a given phosphatide mixture and a given extraction technique only requires a few tests and is within the routine of a man skilled in the art.

The raw material to be fractionated is preferably chosen in function of the fraction or fractions required. If a phosphatide fraction that is virtually free from linolenic acid moieties is desired, sunflower lecithin, cottonseed lecithin or corn germ oil lecithin can be used. For other applications requiring a fraction with not too high an iodine value, rapeseed lecithin may be considered as a raw material.

In general, the fatty acid compositions of the lecithins reflect the fatty acid compositions of the oils those lecithins have been isolated from. There are, however, differences between the fatty acid compositions of oils and their lecithins and also between the fatty acid composition of the individual phosphatides. The saturated fatty acid content of the phosphatides tends to be somewhat higher than that of the corresponding oil and this is especially true for the PI-fractions.

If a PA-rich fraction is the desired product, it is of course advantageous to fractionate a raw material which exhibits an appreciable PA-content. This can be a lecithin selected on that basis but also the gum whether dried or not isolated from water-degummed oil according to U.S. Pat. No. 4,698,185.

As a rule, it can be stated that the purities of the phosphatide fractions obtained according to the process of the invention depend mainly on the particular way this process has been executed and that the yields of these fractions depend mainly upon the composition of the phosphatide mixture used as raw material. Of course yield and purity are interdependent. If, for instance, a high purity PA-fraction is aimed for, it is self-evident that as much PC and PE as possible are to be extracted at high pH-values so as to leave a residue with very low concentration of PC and PE. Some PA will also dissolve and thus decrease its yield which will also be decreased because of the high PA-content of the PA-enriched fraction.

The raw material to be fractionated may contain triglyceride oil or be partially or completely de-oiled. The presence of the oil hardly affects the phosphatide distribution over the extract and the extraction residue so that yields and purities of the phosphatide fractions are also hardly affected. Using oil containing raw materials has the advantage that the residues are less sticky and therefore more easy to handle. Even if ultimately a de-oiled fraction is required it may still be advantageous to use an oil containing raw material and de-oil the fraction after it has been isolated according to the process of the invention because then the amount of material to be de-oiled is far less than when all starting material had to be de-oiled.

Water has been found to decrease the solubilities of the phosphatides in the alcoholic solvent, so that it has some advantages to operate the process of the invention at low water content. Nevertheless, a water content of up to 20% (usually in the range of 0.5 to 15%) has been found to be practicable and this permits the use of aqueous acids, bases and salts when adjusting the acidity of the extraction solvent, permits the use of the ethanolic azeotrope and/or permits the use of water containing gums as starting materials. Care must, however, be taken in this respect in that the use of dilute acids or bases may not only affect the solubility as a result of change in acidity but also by a change in water content and may thus lead to unnecessarily impure precipitates.

The acids or bases (preferably food grade acids and bases) to be used in the process according to the invention are not critical except, of course, when a phosphatide is to be isolated as a particular salt. Thus the addition of ammonia to an acidic solution of PA will lead to the precipitation of the ammonium salt of PA whereas the use of caustic soda, as an aqueous or alcoholic solution, will lead to the sodium salt of PA. Similarly, care must be taken not to form unwanted precipitates of inorganic salts. For the above reasons, hydrochloric acid and ammonia are the preferred acidity regulators; besides, they are cheap and can be added anhydrously.

In addition, it has been found that certain bases for a given pH affect the solubilities of individual phosphatides. If ammonia and choline are compared in this respect, it is surprisingly found that choline greatly increases the solubility of both PC and especially PE. No explanation for this finding can be given.

The temperature at which the process according to the invention is performed can have an important effect on its selectivity and on the amount of solvent required, which effects can profitably be made use of. For safety reasons though, the temperatures are preferably maintained below the boiling point of the alcoholic solvent but superatmospheric conditions are not excluded.

In following the fractionation process, optimizing this process and assessing the fractions, analytical methods to determine phosphatide compositions and phosphatide content are of importance. In this respect, it has been found to be advantageous to use relative methods of analysis which compare the sample with a known standard for routine measurements.

As a standard a sample of MC-Thin (standardized liquid soy bean lecithin available from Lucas Meyer, Hamburg, West-Germany, which according to the sales literature contains 20% PC, 17% PE, 12% PI and 13% other phosphorus containing compounds in addition to 37.5% triglycerides and carbohydrates and 0.5% water) was used. Its phosphatide composition was determined using two-dimensional thin layer chromatography followed by spot revelation, scraping off individual spots, destruction of the phosphatides thus isolated to inorganic phosphates, which phosphates were then converted into a reduced phosphomolybdate complex, the amount of which was measured spectroscopically.

Silica gel TLC-plates (20×20 cm, 2.5 mm) are rinsed with chloroform/methanol (2/1), air dried and activated for 30 min at 110° C. The sample is diluted with chloroform/methanol (2/1) to a phosphorus content of 2000–4000 ppm P and 10–20 microliter of this solution is spotted. The plate is developed using chloroform/methanol/ammonia (28%) (65/40/5) and air dried until no ammonia is perceived any more. Subsequently, the plate is developed a second time in a perpendicular direction using chloroform/acetone/methanol/acetic acid/water (50/20/10/15/5) and air dried. The spots containing phosphorus are visualized using Vaskovsky reagent and outlined with a pencil.

Spots are collected by aspiration using the method of Rouser, Siakatos and Fleischer (Lipids 1, 85–86, 1966) in which the walls of the test tube into which the silica gel is collected have been moistened with 0.5 ml of distilled water in order to retain also the small silica gel particles. The phosphatides thus collected are hydrolysed by the addition of 0.26 ml perchloric acid (70%) and heating the test tubes for 30 min at 180° C. After cooling, 1.5 ml of distilled water, 0.25 ml of ammonium molybdate (2.5%) is added and mixed. Subsequently, 0.25 ml ascorbic acid (10%) is added and mixed. Subsequently, 0.25 ml ascorbic acid (10%) is added and mixed immediately whereupon the tubes are kept at 40° C. for 1 hour. Solids present are removed centrifugally (2 min at 1000 g) and the absorption is measured against water at 820 nm. A blank is also scraped off, treated as above and measured.

The relative amounts of phosphorus determined as described above are then converted into percentage figures after having been corrected for the absorption of the blank. Multiplication by the appropriate molecular weight of the individual phosphatides and subsequent normalisation allows the mole percentages as obtained above to be converted into weight percentages, disregarding the spot at the origin which contains phosphorus but is not a phosphatide.

For routine analyses, a much faster method is preferred, employing one-dimensional TLC and densitometric quantitation. This method uses HPTLC-plates that are activated at 110° C. and employs nine separations per plate: bands 3, 6 and 9 are spotted with the standard (MC-Thin) at increasing concentration (1 µl of solution containing 10, 20 and 40 mg/ml) whereas band 1 and 2, 4 and 5, 7 and 8 are spotted with the sample to be measured (1 microliter of a 40 mg/ml solution). The plates are developed with chloroform/acetone/methanol/acetic acid/water (20/8/4/6/3) and dried in a ventilated oven for 30 min at 60° C. Subsequently, the spots are revealed by immersing the plates in a 0.1% solution of 8-anilino,1-naphthalene sulphonic acid and dried for 25 min at 40° C. Spraying with a 0.5% solution is also possible but leads to a less straight base line during scanning.

Scanning is carried out using a Desaga DC 60 densitometer using a mercury lamp in fluorescence mode (wave length at 367 nm; filter position 450 nm). A slit width of 0.04 mm and a slit height of 6.0 mm were used. The use of three known standards at different amounts then allows a calibration to be calculated for the various phospholipids which calibration was then used for calculating the composition of the unknown sample.

EXAMPLE 1

Soy lecithin with a phosphorus content of 2.057 wt. % (51.4 wt. % phosphatides) was used as the material to study the solubilities of the various individual phosphatides as a function of pH. This lecithin was analyzed by two-dimensional TLC to have the following composition (as % P):

| | |
|---|---|
| "origin" | 6.0 |
| PA | 13.4 |
| PC | 28.8 |
| PE | 23.8 |
| APE | 4.8 |
| PI | 15.4 |
| LPA | 1.7 |
| LPC | 1.3 |
| LPE | 1.3 |
| LPI | 1.9 |
| unknown | 1.6 |

Ethanol was used as the solvent in a fixed lecithin to solvent ratio of 1:3 (wt/vol; g/ml) and with a fixed water content of 5% (wt/vol). The pH was adjusted by using either hydrochloric acid to cover the acid range or choline or a combination of choline and sodium silicate to cover the alkaline range. Alcoholic stock solutions containing known amounts of water and hydrochloric acid, choline or sodium silicate were made up and diluted with absolute ethanol and water to obtain the solvents of variable pH and fixed water content. The amount of lecithin used in each experiment was 25 g and 75 ml of solutions containing the following additions were used:

TABLE I

| code | HCl g | choline g | Na | silicate g | water g | pH |
|---|---|---|---|---|---|---|
| A | 0.200 | — | | — | 3.75 | 1.95 |
| B | 0.100 | — | | — | 3.75 | 3.27 |
| C | 0.025 | — | | — | 3.75 | 4.58 |
| D | — | — | | — | 3.75 | 6.26 |
| E | — | 0.500 | | — | 3.75 | 8.45 |
| F | — | 1.250 | | — | 3.75 | 9.94 |
| G | — | 1.750 | 0.100 | | 3.75 | 10.42 |

These solutions of varying pH were each mixed with 25 g of lecithin at 20° C. and allowed to settle. Then the pH of the supernatant was measured using a pH-electrode. The values found are listed in the last column of Table I. The supernatant was separated from the extraction residue and evaporated to dryness. The extract thus obtained was analyzed for phosphorus content and phosphatide composition. Relevant data are summarized in Table II.

TABLE II

| sample code | A | B | C | D | E | F | G |
|---|---|---|---|---|---|---|---|
| pH | 1.95 | 3.27 | 4.58 | 6.26 | 8.45 | 9.94 | 10.42 |
| extract weight (g) | 7.48 | 6.21 | 6.43 | 3.71 | 6.05 | 9.66 | 15.40 |
| P-content extract (%) | 1.66 | 1.42 | 1.28 | 2.13 | 2.18 | 1.92 | 1.63 |
| phosphatide content extract (%) | 41.4 | 35.5 | 32.0 | 53.1 | 54.4 | 48.0 | 40.8 |
| phosphatides extracted (g) | 3.10 | 2.20 | 2.06 | 1.97 | 3.29 | 4.62 | 6.28 |
| phosphatides extraction yield (%) | 24.1 | 17.1 | 16.0 | 15.3 | 25.6 | 35.9 | 48.8 |
| phospatide composition | | | | | | | |
| origin | 2.7 | 0.9 | 0.4 | 0.4 | 0.9 | 2.5 | 5.2 |
| PA | 22.2 | 8.9 | 3.2 | 2.2 | 3.9 | 1.4 | 1.8 |
| PC | 42.9 | 59.9 | 65.7 | 60.7 | 54.1 | 39.0 | 32.5 |
| PE | 15.3 | 17.0 | 16.6 | 23.1 | 17.3 | 28.6 | 30.6 |
| APE | 6.8 | 5.6 | 7.3 | 8.0 | 10.4 | 8.0 | 8.1 |
| PI | 0.7 | 0.3 | 0.8 | 0.7 | 3.7 | 5.0 | 5.3 |
| LPA | 2.5 | — | — | — | — | — | — |
| LPC | 3.0 | 3.5 | 3.3 | 3.4 | 3.8 | 6.9 | 8.6 |
| LPE | 1.2 | 1.1 | 1.0 | 1.6 | 1.4 | 3.5 | 5.7 |
| PC + LPC extracted (g) | 1.36 | 1.39 | 1.41 | 1.26 | 1.89 | 2.04 | 2.63 |
| PC + LPC extracted (%) | 35.1 | 35.9 | 36.4 | 32.6 | 48.8 | 52.7 | 62.5 |
| PE + LPE extracted (g) | 0.46 | 0.37 | 0.34 | 0.46 | 0.58 | 1.38 | 2.06 |
| PE + LPE extracted (%) | 15.1 | 12.1 | 11.1 | 15.1 | 19.0 | 45.2 | 67.5 |
| PA + LPA extracted (g) | 0.69 | 0.18 | 0.06 | 0.04 | 0.12 | 0.06 | 0.06 |
| PA + LPA extracted (%) | 38.1 | 10.7 | 3.6 | 2.4 | 7.1 | 3.6 | 3.6 |

The phosphorus content of the extract was measured using plasma emission spectroscopy (A. J. Dijkstra and D. Meert, J.A.O.C.S., 59, 199 (1982)) and the value found was multiplied by 25 to arrive at the phosphatide content of the extract. Because of non-phosphatide compounds that still contain phosphorus being present as indicated as "origin" in the TLC-plates and because of varying lyso-contents, the factor 25 may well lead to a slight overestimation of the phosphatide content and thus to the amount of phosphatides extracted.

From the phosphatide composition as determined by two-dimensional TLC followed by revelation, scraping off and phosphorus determination, and the amounts of phosphatides extracted, the amounts of individual phosphatides extracted were calculated. Again, because of the reasons outlined above these may be somewhat overestimated but the errors thus introduced cancel each other to some extent when the extraction yield is calculated as a percentage.

The table illustrates that amount and composition of the extract are highly pH-dependent. The amount is lowest when just aqueous alcohol is used (Sample D), is about double at the lowest pH (Sample A) and double again at the highest pH studied (Sample G). The phosphatide content of the extract is not constant either and exhibits a maximum at slightly alkaline value (Sample E) but it varies much less than the amounts extracted as a function of the pH.

Consequently, the percentage of the phospholipids extracted still reveals a minimum at natural pH and is just over 50% higher at the lowest pH studied and about double that value at the highest pH studied.

A large effect of the pH upon the individual phosphatides is also apparent. At low to natural pH, the amount of PC extracted is about constant and amounts to about 35% of the PC-present in the lecithin, but at increased pH-values the amount of PC extracted increases considerably, being almost double at the highest pH studied as compared with natural pH. The same, but even more strikingly is observed for PE of which only about 15% of the amount present in the lecithin is extracted at acid to neutral pH, which figure increases more than four fold at the highest pH studied. PA on the other hand, is preferentially extracted at high acidity levels.

On the other hand it is also to be noted that the amounts of LPC and LPE found in the highest pH extract exceed those present in the lecithin used in this series of experiments. Apparently, some phospholipids are hydrolysed at the highest pH values which, therefore, are to be used with care.

Finally, it is to be noted that APE exhibits very good solubility at high pH-values and is almost completely extracted in Sample G.

EXAMPLE 2

The solubilities of the individual phosphatides do not only depend strongly upon the pH of the extraction solvent but also upon the chemical nature of the acid or base used to adjust the pH. As in Example 1, an aqueous alcohol with a water content of 5% (wt/vol) was used at 20° C. in a lecithin to solvent ratio of 1:3 (wt/vol) but instead of choline, ammonia was used as base.

TABLE III

| sample code | H | I | J |
|---|---|---|---|
| % NH$_3$ | 0 | 0.13 | 1.33 |
| pH | 5.98 | 8.48 | 9.57 |
| extract weight (g) | 3.72 | 4.79 | 5.07 |
| P content extract (%) | 2.19 | 2.08 | 2.27 |
| phosphatide content extract (%) | 54.8 | 52.0 | 56.8 |
| phosphatides extracted (g) | 2.03 | 2.49 | 2.88 |
| phosphatides extraction yield (%) | 14.4 | 17.7 | 20.5 |
| PC + LPC extracted (%) | 35.8 | 40.1 | 46.4 |
| PE + LPE extracted (%) | 9.9 | 14.4 | 19.9 |

Sample H which was contacted with aqueous alcohol under identical conditions as Sample D in Examle 1 shows very similar figures as Sample D, the difference possibly stemming from the fact that slightly different samples of soy bean lecithin were used. However, both extract weights and extraction yields at increased pH-levels are considerably lower than those given in Table II at comparable pH-values. Apparently, the chemical nature of the base used also has an effect upon the solubilities of the various phosphatides. The trend, that an increased pH leads to increased solubility of PC and especially of PE and thus to increased extraction yields is illustrated by both Example 1 and the present Example 2.

EXAMPLE 3

Three 20 g samples of de-oiled lecithin having a P-content of 3.41% were extracted with 100 ml of acid, neutral and alkaline ethanol containing 5% (wt/vol) of water. Hydrochloric acid and ammonia were used for pH-adjustment. Table IV lists the amounts (in g) and extraction yields of PC, PE and PA present in the starting material and the extracts.

TABLE IV

| type of phosphatide | PC | PE | PA | overall |
|---|---|---|---|---|
| de-oiled lecithin | 6.08 | 3.82 | 1.98 | 20.0 |
| extract (g) at pH = 1.26 | 2.01 | 0.62 | 0.67 | 5.78 |
| extract (g) at pH = 5.83 | 1.82 | 0.38 | 0.16 | 3.48 |
| extract (g) at pH = 9.67 | 2.28 | 0.89 | 0.09 | 4.71 |
| extract (%) at pH = 1.26 | 33.0 | 16.2 | 33.8 | 28.9 |
| extract (%) at pH = 5.83 | 29.0 | 10.0 | 8.1 | 17.4 |
| extract (%) at pH = 9.67 | 37.5 | 23.3 | 4.6 | 23.6 |

Table IV again illustrates that, even if no triglyceride oil is present the amount and extraciton yield for PA are high at low pH and that both PC and PE show a minimum solubility at near neutral pH.

EXAMPLE 4

In this example, the isolation of a PA-rich fraction from the gums obtained when treating water-degummed oil according to U.S. Pat. No. 4,698,185 will be illustrated. Such gums were isolated by using phosphoric acid as the non-toxic, aqueous acid to be finely dispersed in water-degummed soy bean oil and caustic soda as the base, and subsequently dried. Apart from the phosphatides removed from the oil by this process, the gums also contain some triglycerides, free fatty acids (or soaps) and sodium salts of phosphoric acid.

To 100 g of these dried gums were added: 400 ml absolute alcohol, 200 ml of an alcoholic hydrochloric acid solution which had been prepared by adding absolute alcohol to 40 ml of 25 wt. % aqueous hydrochloric acid to a final volume of 200 ml, and 55 ml ethanolic ammonia prepared by diluting 40 ml 25 wt. % aqueous ammonia with absolute ethanol to 200 ml. The pH of this mixture was found to be 3.6. The mixture was agitated at 50° C. and separated by decantation to yield 575 ml of extract containing 36.1 g dissolved matter.

On cooling to 25° C. this extract formed a precipitate which was removed by centrifuge and found to weigh 8.8 g after having been dried. Addition of 20 ml of the 5 wt. % alcoholic ammonia solution described above raised the pH to 7.0 and led to a further precipitate weighing 8.0 g. Further addition of 25 ml of the alcoholic ammonia solution raising the pH to 9.0 yielded only 0.9 g of precipitate.

Analysis of the precipitate formed by the addition of ammonia showed that this contained 70.9 mole % of PA and 16.9 mole % of LPA, PE being the only other main phosphatide, present at 10.4 mole %.

This example illustrates that it is possible to force specific phosphatides to go into solution or to precipitate by choosing and adjusting the appropriate pH and thus to isolate phosphatide fractions that are enriched in a particular phosphatide, in this case PA.

EXAMPLE 5

In this example, a comparison will be made between an extraction of lecithin with ethanol containing 5% (wt/vol) water at non-adjusted and raised pH. In both cases, 800 g of soy lecithin was extacted with 4 l of solvent at 20° C.

TABLE V

|  | non-adjusted pH | raised pH |
|---|---|---|
| pH | 5.68 | 9.68 |
| amount extracted (g) | 237 | 255 |
| P-content of extract (%) | 2.05 | 2.54 |
| phosphatides extracted (%) | 29.1 | 39.6 |
| PC-content extract (wt %) | 51.0 | 63.9 |
| LPC-content extract (wt %) | 6.8 | 4.9 |
| PC + LPC extraction yield (%) | 46.5 | 75.2 |
| PE-content extract (wt %) | 22.7 | 18.3 |
| LPE-content extract (wt %) | 1.3 | 0.7 |
| PE + LPE extraction yield (%) | 28.9 | 31.1 |
| PA-content extract (wt %) | 4.2 | 0 |
| PA extraction yield (%) | 11.6 | 0 |

By just raising the pH with ammonia more phosphatides are extracted from the lecithin. In addition, the PC-content of the extract is raised considerably as a result of which the extraction yield of PC and LPC combined is raised from 46.5% to 75.2% of the PC and LPC present in the starting material. The selectivity of the extraction is also improved in that no PA is extracted at increased pH. Because of the increased phosphatide yield the PE+LPE extraction yield is also increased but, in fact, only slightly because of the decreased PE and LPE content of the extract. It is also interesting to note that the phosphatide content of the extract is increased from 48.9% to 61.8%; a reason for this phenomenon cannot be given.

EXAMPLE 6

An amount of 800 g lecithin (L) was extracted at 20° C. with 4000 ml aqueous ethanol (5% (wt/vol) water) the pH of which was raised to 10.5 with 50 ml of a 10% (w/v) aqueous sodium silicate solution and 135 ml of a 10% (w/v) aqueous sodium hydroxide solution, leading to an extract (E1) containing 263 g dissolved matter and a residue (R1) containing 532 g dry matter. To the extract E1, 200 ml of a 5 wt. % calcium chloride solution in ethanol was added, as a result of which a precipitate (P1) was formed of 69 g which was separated from the supernatant (S1).

The residue R1 was treated with 2660 ml ethanol containing 100 ml of a 37 wt. % aqueous solution of hydrochloric acid at a pH of 0.0 and a temperature of 20° C. The extraction residue (R2) weighed 317 g and the corresponding extract (E2) contained 214 g dry matter. To this extract E2, an amount of 50 ml aqueous ammonia (25 wt. %) was added thus raising the pH to 7.5 and causing an amount of 93 g to precipitate (P2) from the supernatant (S2).

Relevant analytical data are summarized in Table VI.

TABLE VI

| sample | L | E1 | R1 | E2 | P1 | S1 | R2 | P2 | S2 |
|---|---|---|---|---|---|---|---|---|---|
| amount (g) | 800 | 268 | 532 | 214 | 69 | 199 | 317 | 93 | 121 |
| P-content (%) | 2.06 | 2.13 | 1.83 | 2.45 | 2.24 | 2.30 | 1.00 | 2.69 | 2.39 |
| triglycerides (%) | 34.1 | 31.8 | 41.4 | 21.6 | 28.3 | 26.4 | 68.0 | 13.9 | 23.5 |
| "unknowns" (%) | 16.1 | 19.0 | 14.2 | 21.7 | 18.8 | 18.6 | 7.1 | 26.5 | 20.4 |
| "origin" (%) | 2.4 | 1.7 | 4.9 | 5.8 | 0.6 | 1.7 | 5.4 | 10.7 | 1.6 |
| PA (%) | 4.8 | 0.2 | 6.8 | 15.7 | — | — | 0.8 | 24.7 | 1.9 |
| PC (%) | 17.0 | 19.5 | 6.1 | 12.3 | 17.1 | 36.3 | 1.6 | 1.0 | 23.7 |

TABLE VI-continued

| sample | L | E1 | R1 | E2 | P1 | S1 | R2 | P2 | S2 |
|---|---|---|---|---|---|---|---|---|---|
| PE (%) | 11.6 | 13.5 | 9.4 | 9.9 | 24.1 | 10.6 | 3.6 | 6.8 | 14.4 |
| APE (%) | 1.2 | 5.3 | 1.5 | 2.5 | 3.3 | 0.9 | 1.0 | 0.2 | 4.1 |
| PI (%) | 8.9 | 0.6 | 11.3 | 4.3 | — | — | 10.1 | 6.8 | 0.6 |
| LPA (%) | 0.4 | — | 0.6 | 2.0 | — | — | — | 5.0 | — |
| LPC (%) | 1.1 | 5.1 | 0.8 | 2.2 | 0.7 | 4.3 | 0.2 | 0.2 | 2.8 |
| LPE (%) | 0.4 | 1.5 | 0.3 | — | 3.1 | 1.1 | — | 0.7 | 2.9 |
| LPI (%) | 0.9 | — | 1.6 | 1.0 | — | — | 2.2 | 2.0 | — |
| PA + LPA | 10.5 | 0.3 | 16.7 | 31.2 | — | — | 3.1 | 49.8 | 3.4 |
| PC + LPC | 36.2 | 50.1 | 15.4 | 25.5 | 33.7 | 74.0 | 7.2 | 2.1 | 47.3 |
| PE + LPE | 23.2 | 30.5 | 21.8 | 17.4 | 51.5 | 21.3 | 14.5 | 12.6 | 30.8 |
| PI + LPI | 19.5 | 1.2 | 29.0 | 9.4 | — | — | 49.5 | 14.8 | 1.1 |

In this table the weight percentage triglycerides has been estimated by multiplying the P-content by 32.5 and deducting this product from 100%. Because of the lower actual molecular weight of the various phosphatides this leaves an "unknown" in the overall composition of the starting material and its fractions. In the lower section of Table VI the main phosphatides have been grouped together as percentages of the phosphatides present in the starting material and its fractions.

This lower section indeed shows that the alkaline alcoholic extract (E1) is virtually free from PA and LPA and PI and LPI, but also that a complete separation between PC and PE on the one hand and PI and PA on the other has not yet been achieved, given the non-insignificant PC- and PE content of the extraction residue R1. An increase in solvent to lecithin ratio, an increase in temperature or using counter current extraction are useful means to improve upon this separation.

Extract E1 is fractionated into a PE-enriched fraction P1 and PC-enriched fraction S1 by the addition of calcium ions. As to be expected, these fractions are free from PI and PA or their lyso-products. Residue R1 is subjected to an acid extraction as a result of which PA and LPA dissolve preferentially into the extract E2 from which they are precipitated (P2) by raising the pH with ammonia, yielding the PA-enriched fraction P2. The remaining extraction residue R2 constitutes the PI-enriched fraction.

In this example the supernatant S2 could be recycled or combined with the extract E1 from which it differs only slightly in composition, but if a more complete PC- and PE-extraction had been achieved at high pH, this supernatant S2 would have been minimal.

We claim:

1. A process for fractionating a phosphatide mixture into two or more fractions which are enriched in one or more phosphatides selected from the group consisting of phosphatidyl choline (PC), phosphatidyl ethanolamine (PE), phosphatidyl inositol (PI) and phosphatidic acid (PA), comprising the following steps:
   (a) extracting the phosphatide mixture one or more times with a solvent selected from $C_1$ to $C_3$ alcohols and mixtures thereof having a water content of 0 to 20% by weight wherein the solubilities of phosphatidyl choline, phosphatidyl ethanolamine and phosphatidic acid are controlled by adjusting the acidity of the solvent, the pH being adjusted to above 8 for solubilizing phosphatidyl choline and phosphatidyl ethanolamine, the pH being adjusted to below 5 for solubilizing phosphatidic acid and phosphatidic inositol being substantially insoluble in the solvent and remaining in the extraction residue;
   (b) separating the solvent phase from the extraction residue and recovering said residue; and
   (c) recovering the extracted phosphatide or phosphatides from the solvent phase by precipitating the phosphatide or phosphatides and/or removing the solvent.

2. A process according to claim 1, wherein one or more of the fractions obtained in steps (b) and (c) is subjected to a further treatment in accordance with steps (a) to (c) using a solvent of different acidity.

3. A process according to claim 1, wherein phosphatidyl choline and phosphatidyl ethanolamine are solubilized in step (a) by adjusting the pH of the solvent to above 9.

4. A process according to claim 1, wherein phosphatidic acid is solubilized in step (a) by adjusting the pH of the solvent to below 3.

5. A process according to claim 4, wherein the pH is adjusted to below 2.

6. A process according to claim 1, wherein the extraction in step (a) is carried out using a solvent having a pH greater than 8 in order to extract PC and PE; and wherein most of the extracted PE in the solvent phase which is separated from the extraction residue in step (b) is precipitated as a heavy lower phase by adding a calcium salt solution to said solvent phase; the so formed heavy lower phase comprising the precipitated PE is separated from the light upper solvent phase comprising most of the PC; and the solvent is removed from each of the separated phases by evaporation in order to recover a fraction enriched in PC from the light upper solvent phase and a fraction enriched in PE from the heavy lower precipitate phase.

7. Process according to claim 6 in which a fraction enriched in PC is recovered by adding water to said light upper solvent phase to form a heavy lower PC-rich phase and separating said heavy lower PC-rich phase and removing the solvent therefrom by evaporation.

8. Process according to claim 6 in which the extraction residue recovered in step b) is extracted in step d) with the solvent at a pH below 5 to solubilize PA, the two phases obtained are separated and a fraction enriched in PA is recovered from the solvent phase and a fraction enriched in PI is recovered from the heavy lower extraction residue phase by solvent evaporation.

9. Process according to claim 8 in which said fraction enriched in PA is recovered from the solvent phase by sufficiently raising the pH of the solvent phase through the addition of a base, separating the heavy lower phase thus formed and removing the solvent from said heavy lower phase by evaporation.

10. Process according to claim 1 in which in step a) the phosphatide mixture is extracted with the solvent at a pH below 5 to solubilize PA and in step c) a fraction enriched in PA is recovered from the solvent phase, by raising the pH of the solvent phase through the addition of a base, separating the heavy lower phase thus formed and removing the solvent from said heavy lower phase by evaporation.

11. Process according to claim 10 in which the extraction residue recovered in step b) is extracted in step d) with the solvent at a pH above 8, a sufficient amount of a calcium salt solution is added to the separated solvent phase to leave most of the PC in solution and to precipitate most of the PE as a heavy lower phase, the two phases are separated, and a fraction enriched in PC is recovered from the light upper solvent phase and a fraction enriched in PE is recovered from the heavy lower phase by solvent evaporation.

12. Process according to claim 11 in which a fraction enriched in PC is recovered by adding water to said light upper solvent phase to form a heavy lower PC-rich phase and separating said heavy lower PC-rich phase and removing the solvent therefrom by evaporation.

13. Process according to claim 1 in which food grade acids and/or bases used for adjusting the acidity of the solvent.

14. Process according to claim 1 in which hydrochloric acid, ammonia and/or choline are used for adjusting the acidity of the solvent.

15. Process according to claim 1 in which the phosphatide mixture to solvent ratio (g/ml) is 1:1 to 1:10.

16. Process according to claim 1 in which the phosphatide mixture to solvent ratio (g/ml) is 1:2 to 1:6.

17. Process according to claim 1 in which the phosphatide mixture to solvent ratio (g/ml) is about 1:3.

18. Process according to claim 1 in which the extraction step a) is carried out counter-currently.

19. Process according to claim 1 in which the phosphatide mixture is a water containing or dried gum composition obtained from triglyceride oil degumming.

20. Process according to claim 1 in which the phosphatide mixture is de-oiled lecithin.

21. A process according to claim 6, wherein the calcium salt is calcium chloride.

* * * * *